United States Patent
Murayama (10) Patent No.: US 11,618,435 B2
(45) Date of Patent: Apr. 4, 2023

(54) VEHICLE CONTROL SYSTEM AND VEHICLE CONTROL METHOD

(71) Applicant: Toyota Jidosha Kabushiki Kaisha, Toyota (JP)

(72) Inventor: Takemi Murayama, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 70 days.

(21) Appl. No.: 17/226,170

(22) Filed: Apr. 9, 2021

(65) Prior Publication Data

US 2021/0323535 A1   Oct. 21, 2021

(30) Foreign Application Priority Data

Apr. 21, 2020 (JP) .............. JP2020-075269

(51) Int. Cl.
   *B60W 30/02* (2012.01)
(52) U.S. Cl.
   CPC ....... *B60W 30/02* (2013.01); *B60W 2520/125* (2013.01)
(58) Field of Classification Search
   CPC .............. B60W 30/02; B60W 2520/125
   See application file for complete search history.

(56) References Cited

U.S. PATENT DOCUMENTS

| | | | |
|---|---|---|---|
| 10,759,419 B2 | 9/2020 | Kindo et al. | |
| 10,768,307 B2 | 9/2020 | Abari | |
| 10,843,688 B2 | 11/2020 | Taki et al. | |
| 10,864,909 B2 | 12/2020 | Taki et al. | |
| 10,960,891 B2 | 3/2021 | Kindo et al. | |
| 10,992,166 B2 | 4/2021 | Hsieh et al. | |
| 11,001,263 B2 | 5/2021 | Shimizu et al. | |
| 11,008,018 B1 | 5/2021 | McGill et al. | |
| 11,027,722 B2 | 6/2021 | Mizuno et al. | |
| 11,030,863 B2 | 6/2021 | Kurtovic et al. | |
| 11,041,957 B2 | 6/2021 | Uehara | |
| 11,091,035 B2 | 8/2021 | Okada | |
| 11,208,107 B2 | 12/2021 | Urano et al. | |
| 11,214,254 B2 | 1/2022 | Vanterpool et al. | |

(Continued)

FOREIGN PATENT DOCUMENTS

| | | |
|---|---|---|
| JP | 2017-165216 A | 9/2017 |
| JP | 2018-136700 A | 8/2018 |

*Primary Examiner* — Jeff A Burke
*Assistant Examiner* — Mohamad O El Sayah
(74) *Attorney, Agent, or Firm* — Dinsmore & Shohl LLP (57) ABSTRACT

A vehicle control system executes vehicle stability control and driving assist control. The vehicle control system calculates an unstable state quantity representing instability of the vehicle and an activation threshold of the vehicle stability control, based on a vehicle state detected by a sensor installed on the vehicle. A state change amount is an amount of increase in the unstable state quantity from an average unstable state quantity that is obtained when a lateral acceleration of the vehicle is within a predetermined range. A threshold change amount is an amount of increase in the activation threshold from an average activation threshold that is obtained when the lateral acceleration is within the predetermined range. When the driving assist control is in execution, the vehicle control system activates the vehicle stability control in response to the state change amount becoming larger than the threshold change amount.

6 Claims, 7 Drawing Sheets

(56) References Cited

U.S. PATENT DOCUMENTS

| | | | |
|---|---|---|---|
| 11,214,274 B2 | 1/2022 | Hansel et al. | |
| 11,216,000 B2 | 1/2022 | Johnson et al. | |
| 11,220,257 B2 | 1/2022 | Akatsuka | |
| 11,235,766 B2 | 2/2022 | Masui et al. | |
| 11,256,986 B2 | 2/2022 | Tang et al. | |
| 11,267,460 B2 | 3/2022 | Sugano | |
| 11,279,372 B2 | 3/2022 | Bobier-Tiu et al. | |
| 11,285,967 B2 | 3/2022 | Williams | |
| 11,307,586 B2 | 4/2022 | James | |
| 11,314,252 B2 | 4/2022 | Kuffner, Jr. | |
| 11,314,253 B2 | 4/2022 | Kuffner, Jr. | |
| 11,318,943 B2 | 5/2022 | Yokota | |
| 11,325,603 B2 | 5/2022 | McGill, Jr. et al. | |
| 11,370,437 B2 | 6/2022 | Sakai et al. | |
| 11,377,149 B2 | 7/2022 | Sato et al. | |
| 11,447,129 B2 | 9/2022 | Mangalam et al. | |
| 2007/0299580 A1* | 12/2007 | Lin | B60W 50/16 701/41 |
| 2008/0208409 A1* | 8/2008 | Matsumoto | B60W 30/16 701/41 |
| 2018/0201242 A1* | 7/2018 | Bretzigheimer | B60T 8/17557 |
| 2018/0237008 A1 | 8/2018 | Matsumura | |
| 2018/0312161 A1* | 11/2018 | Asakura | B60W 10/00 |
| 2019/0168745 A1* | 6/2019 | Hashimoto | B60W 30/045 |
| 2019/0184978 A1* | 6/2019 | Park | B60T 8/17558 |
| 2020/0086856 A1* | 3/2020 | Park | B62D 15/0255 |
| 2020/0156607 A1* | 5/2020 | Ueno | B60W 30/02 |
| 2020/0231161 A1* | 7/2020 | Gim | B60W 10/06 |
| 2021/0094611 A1* | 4/2021 | Kim | B62D 5/0484 |
| 2022/0144249 A1* | 5/2022 | Do | B60T 8/17551 |

\* cited by examiner

VEHICLE CONTROL SYSTEM AND VEHICLE CONTROL METHOD

CROSS-REFERENCE TO RELATED APPLICATIONS

The present application claims priority under 35 U.S.C. § 119 to Japanese Patent Application No. 2020-075269, filed Apr. 21, 2021, of which the contents are incorporated herein by reference in their entirety.

BACKGROUND

Technical Field

The present disclosure relates to a vehicle control system and a vehicle control method that control travel of a vehicle.

Background Art

Japanese Laid-Open Patent Publication No. JP-2017-165216 discloses a travel control device of a vehicle. The travel control device performs electronic stability control (ESC). In an automated driving state, when the electronic stability control operates so that the vehicle turns toward an outer boundary of a curve road, the travel control device determines whether or not there is a possibility of occurrence of a dangerous condition such as a lane departure and a contact with an oncoming vehicle. When there is a possibility of occurrence of the dangerous condition, the travel control device aborts the electronic stability control. Then, the travel control device performs emergency avoidance control so that the vehicle turns toward an inner boundary of the curve road.

Japanese Laid-Open Patent Publication No. JP-2018-136700 discloses a control device of a vehicle. The control device performs automated driving control such that the vehicle automatically travels along a target travel line. In addition, the control device performs lane departure avoidance control that avoids a departure of the vehicle from a travel lane.

SUMMARY

The electronic stability control disclosed in Japanese Laid-Open Patent Publication No. JP-2017-165216 is vehicle stability control that stabilizes a behavior of a vehicle. Each of the automated driving control and the lane departure avoidance control disclosed in Patent Literature 2 is driving assist control that assists driving of a vehicle. When the driving assist control is in execution, it is especially desired to enhance vehicle stability. To that end, it may be considered to decrease an activation threshold of the vehicle stability control to facilitate activation of the vehicle stability control. However, as the activation threshold becomes lower, an influence of a sensor error such as zero error and the like becomes larger. As a result, erroneous activation of the vehicle stability control becomes more likely to occur.

An object of the present disclosure is to provide a technique capable of enhancing vehicle stability while suppressing erroneous activation of vehicle stability control when driving assist control is in execution.

A first aspect is directed to a vehicle control system that controls travel of a vehicle.

The vehicle control system includes:
a processor configured to execute vehicle stability control that stabilizes a behavior of the vehicle and driving assist control that assists driving of the vehicle; and
a memory storing vehicle state information that indicates a vehicle state detected by a sensor installed on the vehicle.

The processor is further configured to calculate an unstable state quantity representing instability of the vehicle and an activation threshold of the vehicle stability control, based on the vehicle state indicated by the vehicle state information.

An average unstable state quantity is an average value of the unstable state quantity when a lateral acceleration of the vehicle is within a predetermined range.

An average activation threshold is an average value of the activation threshold when the lateral acceleration is within the predetermined range.

A state change amount is an amount of increase in the unstable state quantity from the average unstable state quantity.

A threshold change amount is an amount of increase in the activation threshold from the average activation threshold.

When the driving assist control is in execution, the processor is further configured to activate the vehicle stability control in response to the state change amount becoming larger than the threshold change amount.

A second aspect is directed to a vehicle control method that controls travel of a vehicle.

The vehicle control method includes:
executing vehicle stability control that stabilizes a behavior of the vehicle;
executing driving assist control that assists driving of the vehicle;
detecting a vehicle state by a sensor installed on the vehicle; and
calculating an unstable state quantity representing instability of the vehicle and an activation threshold of the vehicle stability control, based on the vehicle state detected by the sensor.

An average unstable state quantity is an average value of the unstable state quantity when a lateral acceleration of the vehicle is within a predetermined range.

An average activation threshold is an average value of the activation threshold when the lateral acceleration is within the predetermined range.

A state change amount is an amount of increase in the unstable state quantity from the average unstable state quantity.

A threshold change amount is an amount of increase in the activation threshold from the average activation threshold.

The vehicle control method further includes activating the vehicle stability control in response to the state change amount becoming larger than the threshold change amount, when the driving assist control is in execution.

According to the present disclosure, an activation condition of the vehicle stability control when the driving assist control is in execution is that "the state change amount becomes larger than the threshold change amount." The state change amount is the amount of increase in the unstable state quantity from the average unstable state quantity. The threshold change amount is the amount of increase in the activation threshold from the average activation threshold. Using the above-described activation condition facilitates the activation of the vehicle stability control as compared with a case where the activation condition is that "the unstable state quantity becomes larger than the activation threshold." That is to say, the vehicle stability control is activated at an earlier point. Since the vehicle stability control is activated before an unstable behavior of the vehicle becomes large, the vehicle stability when the driving assist control is in execution is further increased.

Moreover, according to the present disclosure, the influence of the sensor error (e.g., zero error and the like) on the activation of the vehicle stability control is reduced due to the following reason. The unstable state quantity is calculated based on the vehicle state that is detected by the sensor installed on the vehicle. The average unstable state quantity is the average value of the unstable state quantity when the lateral acceleration is within the predetermined range. The sensor error is responsible for errors of the unstable state quantity and the average unstable state quantity. However, since both the unstable state quantity and the average unstable state quantity are calculated based on the same vehicle state, trends of respective errors are consistent with each other. Therefore, when a difference between the unstable state quantity and the average unstable state quantity is calculated, the respective errors are canceled with each other. As a result, the influence of the sensor error on the state change amount being the difference is reduced. Due to the same reason, the influence of the sensor error on the threshold change amount being a difference is reduced. Whether or not to activate the vehicle stability control is determined based on the state change amount and the threshold change amount. Accordingly, the influence of the sensor error on the activation of the vehicle stability control is reduced. As a result, the erroneous activation of the vehicle stability control caused by the sensor error is suppressed.

As described above, according to the present disclosure, it is possible to enhance the vehicle stability while suppressing the erroneous activation of the vehicle stability control when the driving assist control is in execution.

EMBODIMENTS

Embodiments of the present disclosure will be described with reference to the accompanying drawings.

1. Outline of Vehicle Control System

Figure 1:
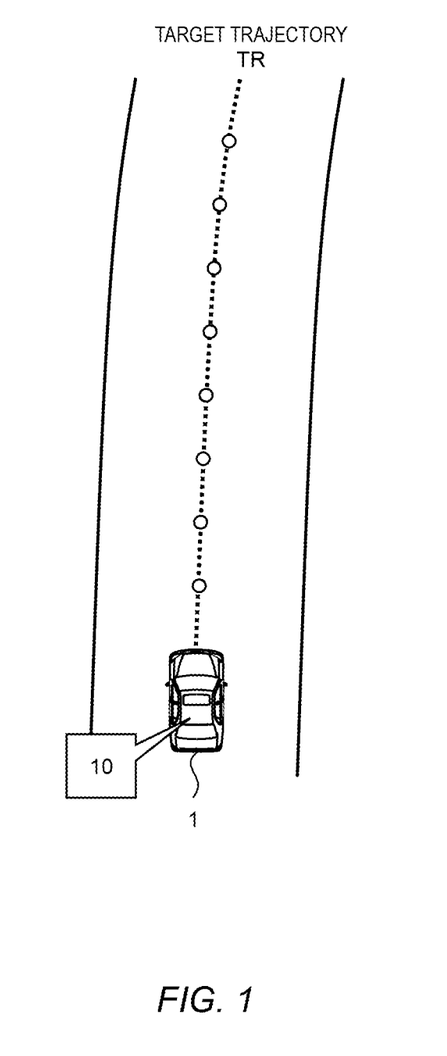
FIG. 1 is a conceptual diagram for explaining an outline of a vehicle control system according to an embodiment of the present disclosure.

FIG. 1 is a conceptual diagram for explaining an outline of a vehicle control system 10 according to the present embodiment. The vehicle control system 10 executes "vehicle travel control" that automatically controls travel of a vehicle 1. The vehicle travel control includes at least one of steering control, acceleration control, and braking control. Typically, the vehicle control system 10 is installed on the vehicle 1. Alternatively, at least a part of the vehicle control system 10 may be placed in an external device outside the vehicle 1 and remotely executes the vehicle travel control.

The vehicle travel control is applied to "driving assist control" that assists driving of the vehicle 1. Examples of the driving assist control include automated driving control, risk avoidance control, lane keep assist control (lane tracing assist (LTA)), and the like. The automated driving control controls automated driving of the vehicle 1. For example, the automated driving control performs the vehicle travel control such that the vehicle 1 automatically travels toward a destination. The risk avoidance control performs at least one of the steering control and the braking control in order to reduce a risk of collision with an object existing ahead of the vehicle 1. The lane keep assist control performs the vehicle travel control such that the vehicle 1 travels along a travel lane.

Typically, a target trajectory TR is used in the driving assist control. The target trajectory TR includes target positions and target velocities of the vehicle 1 in a road on which the vehicle 1 travels. The vehicle control system 10 generates the target trajectory TR and performs the vehicle travel control such that the vehicle 1 follows the target trajectory TR. Such the driving assist control is also called trajectory following control.

Moreover, the vehicle travel control is also applied to "vehicle stability control (VSC)" that stabilizes a behavior of the vehicle 1. The vehicle stability control is also called "electronic stability control." For example, at a time when the vehicle 1 turns, the vehicle control system 10 detects an unstable behavior such as sideslip, understeer, oversteer, and the like based on a vehicle state that is detected by a sensor installed on the vehicle 1. When the unstable behavior is detected, the vehicle control system 10 generates such a counter yaw moment that counteracts the unstable behavior. For example, the vehicle control system 10 generates the counter yaw moment by performing the braking control to generate a difference in braking force between left and right wheels. As another example, the vehicle control system 10 may generate the counter yaw moment by performing the steering control to turn (i.e., change a direction of) the wheel. Due to resolution of the unstable behavior, the behavior of the vehicle 1 is stabilized.

According to the present embodiment, an activation condition (intervention condition) of the vehicle stability control is different between when the driving assist control is in execution and when the driving assist control is not in execution. More specifically, when the driving assist control is in execution, the activation (intervention) of the vehicle stability control is facilitated as compared with when the driving assist control is not in execution. For example, when the automated driving control is in execution, the activation of the vehicle stability control is facilitated as compared with when manual driving is performed by a driver. Hereinafter, each of the case where the driving assist control is in execution and the case where the driving assist control is not in execution will be described.

2. Vehicle Stability Control when Driving Assist Control is not in Execution The sensor installed on the vehicle 1 detects the vehicle state such as a vehicle speed, a steering angle, a yaw rate, a lateral acceleration, and the like. Based on the vehicle state detected by the sensor, the vehicle control system 10 calculates an "unstable state quantity DS" that represents instability of the vehicle 1.

For example, the unstable state quantity DS is an absolute value of a deviation between an actual yaw rate and a target yaw rate (expected yaw rate). A fact that the actual yaw rate is higher than the target yaw rate means an oversteer trend. On the other hand, a fact that the actual yaw rate is lower than the target yaw rate means an understeer trend. The actual yaw rate is detected by the sensor. The target yaw rate is calculated in accordance with a publicly-known formula that includes the steering angle and the vehicle speed as parameters. The vehicle control system 10 calculates the target yaw rate according to the steering angle and the vehicle speed detected by the sensor, and calculates the absolute value of the deviation between the target yaw rate and the actual yaw rate as the unstable state quantity DS.

Figure 2:
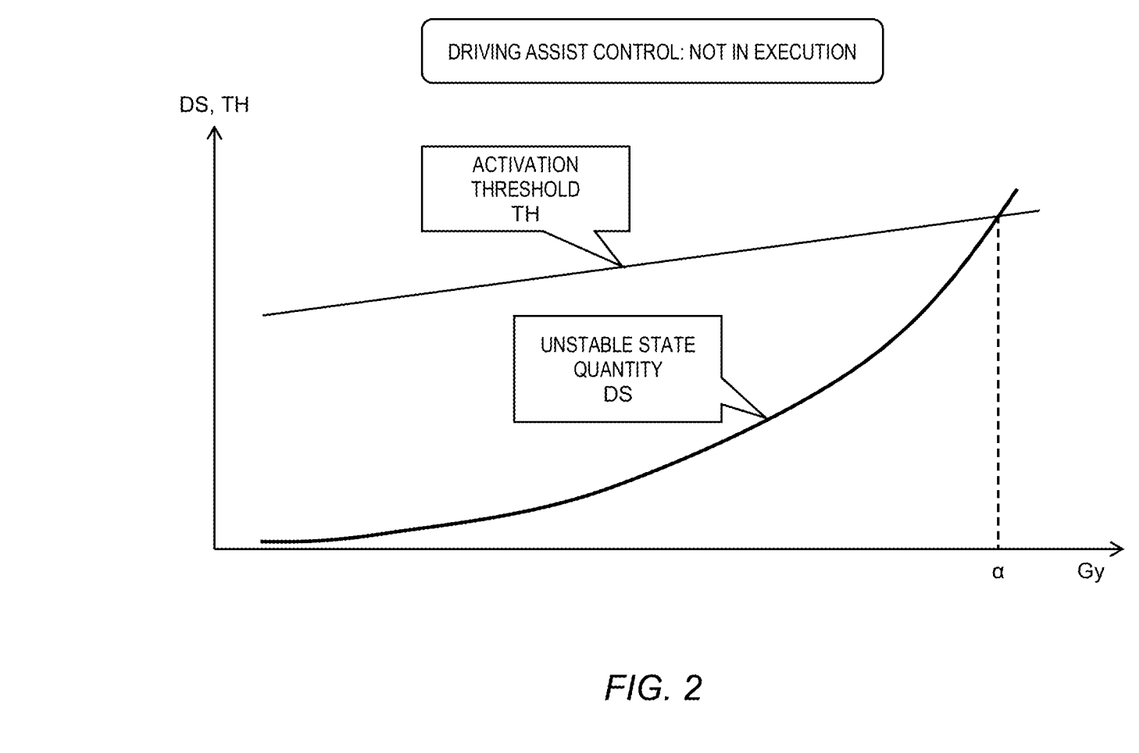
FIG. 2 is a conceptual diagram for explaining vehicle stability control when driving assist control is not in execution according to an embodiment of the present disclosure.

FIG. 2 is a conceptual diagram for explaining the vehicle stability control when the driving assist control is not in execution. A horizontal axis represents the lateral acceleration Gy. A vertical axis represents the unstable state quantity DS and the activation threshold TH of the vehicle stability control. The unstable state quantity DS increases as the lateral acceleration Gy increases.

The activation threshold TH of the vehicle stability control is set to be relatively large in order to prevent erroneous activation of the vehicle stability control caused by the sensor error and the like. Moreover, according to the present embodiment, the activation threshold TH of the vehicle stability control varies according to the vehicle state. The vehicle control system 10 calculates the activation threshold TH of the vehicle stability control based on the vehicle state detected by the sensor. For example, a map indicating a correspondence relationship between the vehicle state and the activation threshold TH is used for calculating the activation threshold TH. In the example shown in FIG. 2, the activation threshold TH increases as the lateral acceleration Gy increases.

In the case where the driving assist control is not in execution, the activation condition of the vehicle stability control is that "the unstable state quantity DS is larger than the activation threshold TH." The vehicle control system 10 activates the vehicle stability control in response to the unstable state quantity DS becoming larger than the activation threshold TH. In the example shown in FIG. 2, the vehicle stability control is activated at a point where the lateral acceleration Gy becomes α.

3. Vehicle Stability Control when Driving Assist Control is in Execution

Figure 3:
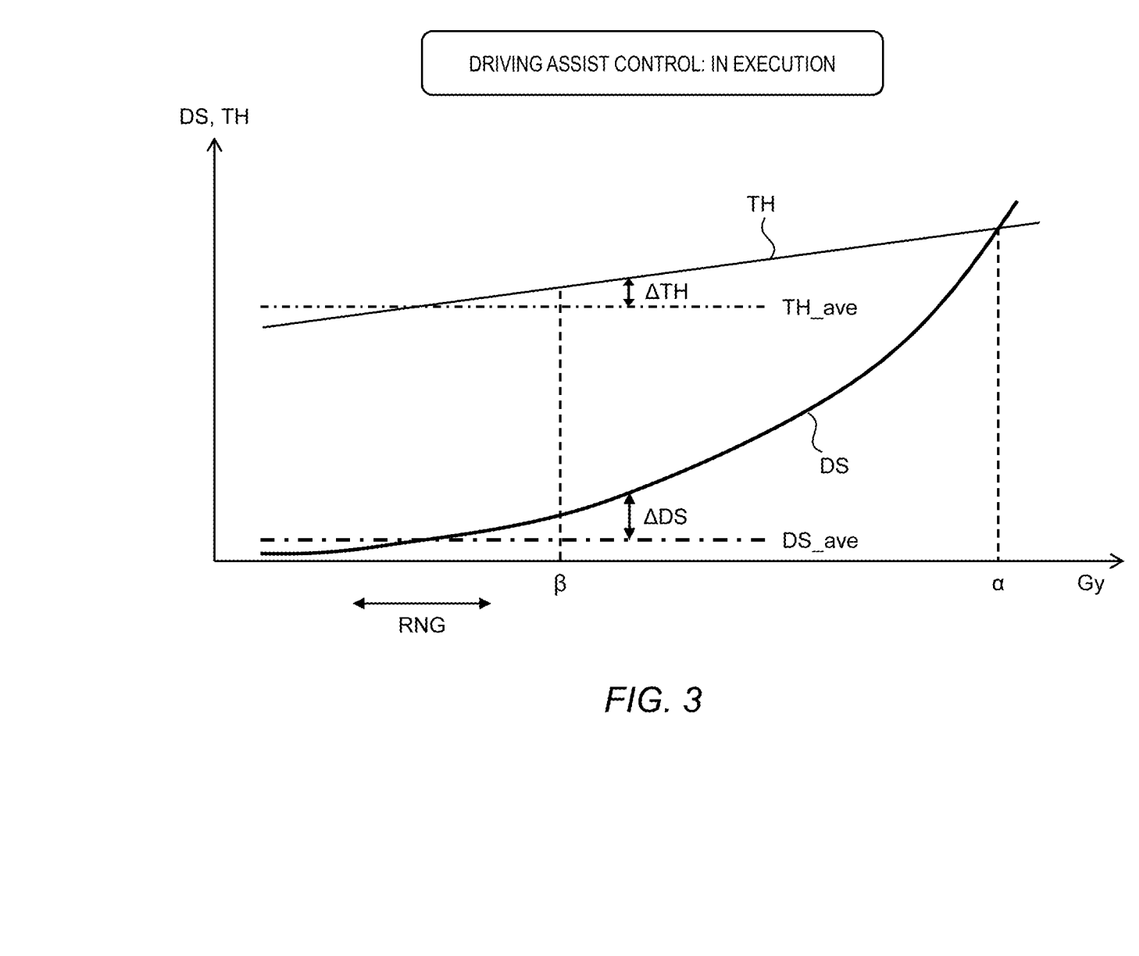
FIG. 3 is a conceptual diagram for explaining vehicle stability control when driving assist control is in execution according to an embodiment of the present disclosure.

FIG. 3 is a conceptual diagram for explaining the vehicle stability control when the driving assist control is in execution. The format of FIG. 3 is the same as that of FIG. 2. Regarding the lateral acceleration Gy, a predetermined low-lateral acceleration range RNG where the vehicle behavior is stable is considered. For example, an upper limit of the low-lateral acceleration range RNG is 0.5G (here, G is the acceleration of gravity). For example, the low-lateral acceleration range RNG is a range from 0.4G to 0.5G.

An average unstable state quantity DS_ave is an average value of the unstable state quantity DS when the lateral acceleration Gy is within the low-lateral acceleration range RNG. For example, the average unstable state quantity DS_ave is a parameter that is measured and given in advance. As another example, the vehicle control system 10 may update the average unstable state quantity DS_ave based on the unstable state quantity DS that is calculated and accumulated every time the vehicle travel is performed.

A state change amount $\Delta DS$ is a difference between the unstable state quantity DS and the average unstable state quantity DS_ave (i.e., $\Delta DS=DS-DS\_ave$). More specifically, the state change amount $\Delta DS$ is an amount of increase in the unstable state quantity DS from the average unstable state quantity DS_ave, which is a positive value.

An average activation threshold TH_ave is an average value of the activation threshold TH of the vehicle stability control when the lateral acceleration Gy is within the low-lateral acceleration range RNG. For example, the average activation threshold TH_ave is a parameter that is measured and given in advance. As another example, the vehicle control system 10 may update the average activation threshold TH_ave based on the activation threshold TH that is calculated and accumulated every time the vehicle travel is performed.

A threshold change amount $\Delta TH$ is a difference between the activation threshold TH and the average activation threshold TH_ave (i.e., $\Delta TH=TH-TH\_ave$). More specifically, the threshold change amount $\Delta TH$ is an amount of increase in the activation threshold TH from the average activation threshold TH_ave, which is a positive value.

In the case where the driving assist control is in execution, the activation condition of the vehicle stability control is that "the state change amount $\Delta DS$ is larger than the threshold change amount $\Delta TH$." The vehicle control system 10 activates the vehicle stability control in response to the state change amount $\Delta DS$ becoming larger than the threshold change amount $\Delta TH$. In the example shown in FIG. 3, the vehicle stability control is activated at a point where the lateral acceleration Gy becomes β that is lower than α.

As is clearly seen from a comparison between FIGS. 2 and 3, when the driving assist control is in execution, the vehicle stability control is more likely to be activated as compared with when the driving assist control is not in execution. In other words, when the driving assist control is in execution, the vehicle stability control is activated at an earlier point as compared with when the driving assist control is not in execution. That is, using "the state change amount $\Delta DS$ being larger than the threshold change amount $\Delta TH$" instead of "the unstable state quantity DS being larger than the activation threshold TH" as the activation condition brings about the same effect as in the case of lowering the activation threshold TH. It is possible to acquire the same effect as in the case of lowering the activation threshold TH without actually lowering the activation threshold TH.

4. Effects

According to the present embodiment, as described above, "the state change amount $\Delta DS$ being larger than the threshold change amount $\Delta TH$" is used as the activation condition of the vehicle stability control when the driving assist control in execution. As a result, when the driving assist control is in execution, the vehicle stability control is facilitated, that is, the vehicle stability control is activated at an earlier point. Since the vehicle stability control is activated before an unstable behavior of the vehicle 1 becomes large, the vehicle stability when the driving assist control is in execution is further increased.

In the driving assist control, the vehicle control system 10 may perform the vehicle travel control such that the vehicle 1 follows the target trajectory TR. As a result of the increase in the vehicle stability when the driving assist control is in execution, trajectory-following performance with respect to the target trajectory TR also is increased.

Furthermore, according to the present embodiment, the influence of the sensor error (e.g., zero error and the like) on the activation of the vehicle stability control is reduced due to the following reason. The unstable state quantity DS is calculated based on the vehicle state that is detected by the sensor installed on the vehicle 1. The average unstable state quantity DS_ave is the average value of the unstable state quantity DS when the lateral acceleration Gy is within the low-lateral acceleration range RNG. The sensor error is responsible for errors of the unstable state quantity DS and the average unstable state quantity DS_ave. However, since both the unstable state quantity DS and the average unstable state quantity DS_ave are calculated based on the same vehicle state, trends of respective errors are consistent with each other. Therefore, when a difference between the unstable state quantity DS and the average unstable state quantity DS_ave is calculated, the respective errors are canceled with each other. As a result, the influence of the sensor error on the state change amount ΔDS being the difference is reduced. Due to the same reason, the influence of the sensor error on the threshold change amount ΔTH being a difference is reduced. Whether or not to activate the vehicle stability control is determined based on the state change amount ΔDS and the threshold change amount ΔTH. Accordingly, the influence of the sensor error on the activation of the vehicle stability control is reduced.

As a comparative example, decreasing the activation threshold TH itself of the vehicle stability control in order to early activate the vehicle stability control is considered. However, as the activation threshold TH becomes lower, the influence of the sensor error such as the zero error and the like becomes larger. As a result, erroneous activation of the vehicle stability control becomes more likely to occur.

On the other hand, according to the present embodiment, "the state change amount ΔDS being larger than the threshold change amount ΔTH" is used as the activation condition in order to early activate the vehicle stability control. In the case of this activation condition, the influence of the sensor error is reduced as described above. Therefore, the erroneous activation of the vehicle stability control caused by the sensor error is suppressed. That is, according to the present embodiment, when the driving assist control is in execution, it is possible to early activate the vehicle stability control while suppressing the erroneous activation of the vehicle stability control and thus to appropriately enhance the vehicle stability.

5. Concrete Example of Vehicle Control System

5-1. Configuration Example

Figure 4:
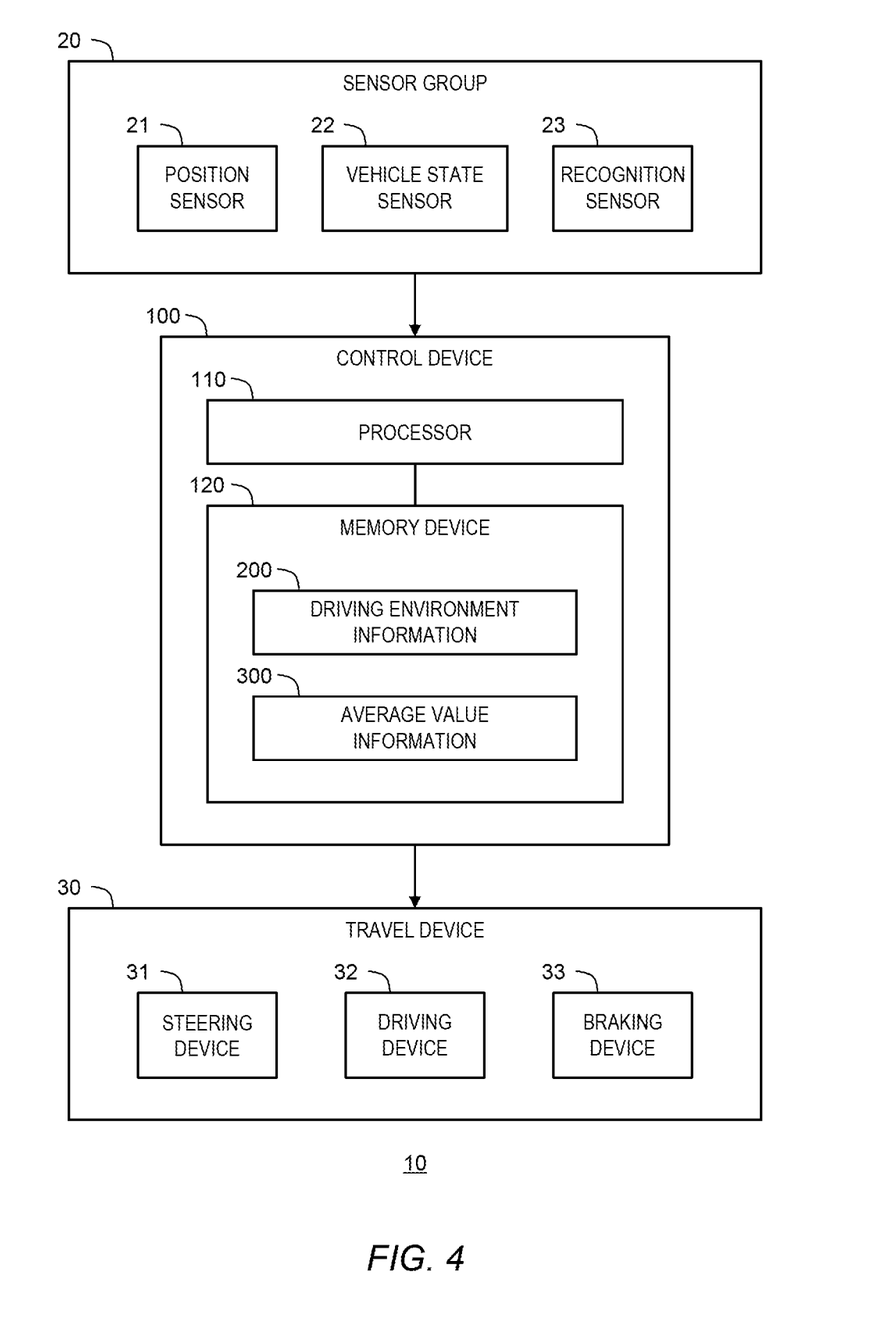
FIG. 4 is a block diagram showing a configuration example of the vehicle control system according to an embodiment of the present disclosure.

FIG. 4 is a block diagram showing a configuration example of the vehicle control system 10 according to the present embodiment. The vehicle control system 10 includes a sensor group 20, a travel device 30, and a control device (controller) 100.

The sensor group 20 is installed on the vehicle 1. The sensor group 20 includes a position sensor 21, a vehicle state sensor 22, and a recognition sensor 23. The position sensor 21 detects a position and an orientation of the vehicle 1. As the position sensor 21, a GPS (Global Positioning System) sensor is exemplified. The vehicle state sensor 22 detects the vehicle state of the vehicle 1. Examples of the vehicle state sensor 22 include a vehicle speed sensor (a wheel speed sensor), a yaw rate sensor, a lateral acceleration sensor, a steering angle sensor, a steering torque sensor, and the like. The recognition sensor 23 recognizes (detects) a situation around the vehicle 1. Examples of the recognition sensor 23 include a camera, a radar, a LIDAR (Laser Imaging Detection and Ranging), and the like.

The travel device 30 includes a steering device 31, a driving device 32, and a braking device 33. The steering device 31 turns (i.e., changes a direction of) the wheel of the vehicle 1. For example, the steering device 31 includes an electric power steering (EPS) device. The driving device 32 is a power source that generates a driving force. Examples of the drive device 32 include an engine, an electric motor, an in-wheel motor, and the like. The braking device 33 generates a braking force. The braking device 33 is configured to be capable of independently adjusting the braking forces of a plurality of wheels of the vehicle 1.

The control device (controller) 100 controls the vehicle 1. Typically, the control device 100 is a microcomputer installed on the vehicle 1. The control device 100 is also called an ECU (Electronic Control Unit). The control device 100 may be a combination of a plurality of ECUs. Alternatively, the control device 100 may be an information processing device outside the vehicle 1. In that case, the control device 100 communicates with the vehicle 1 and remotely controls the vehicle 1.

The control device 100 includes one or more processors 110 (hereinafter, simply referred to as a processor 110) and one or more memory devices 120 (hereinafter, simply referred to as a memory device 120). The processor 110 executes a variety of processing. The memory device 120 stores a variety of information. Examples of the memory device 120 include a volatile memory, a nonvolatile memory, and the like. The variety of processing by the processor 110 (the control device 100) is achieved by the processor 110 executing a control program being a computer program. The control program is stored in the memory device 120 or recorded in a computer-readable recording medium.

5-2. Information Acquisition Process

The processor 110 executes an information acquisition process that acquires driving environment information 200 indicating a driving environment for the vehicle 1. The driving environment information 200 is acquired based on a result of detection by the sensor group 20 installed on the vehicle 1. The acquired driving environment information 200 is stored in the memory device 120.

Figure 5:
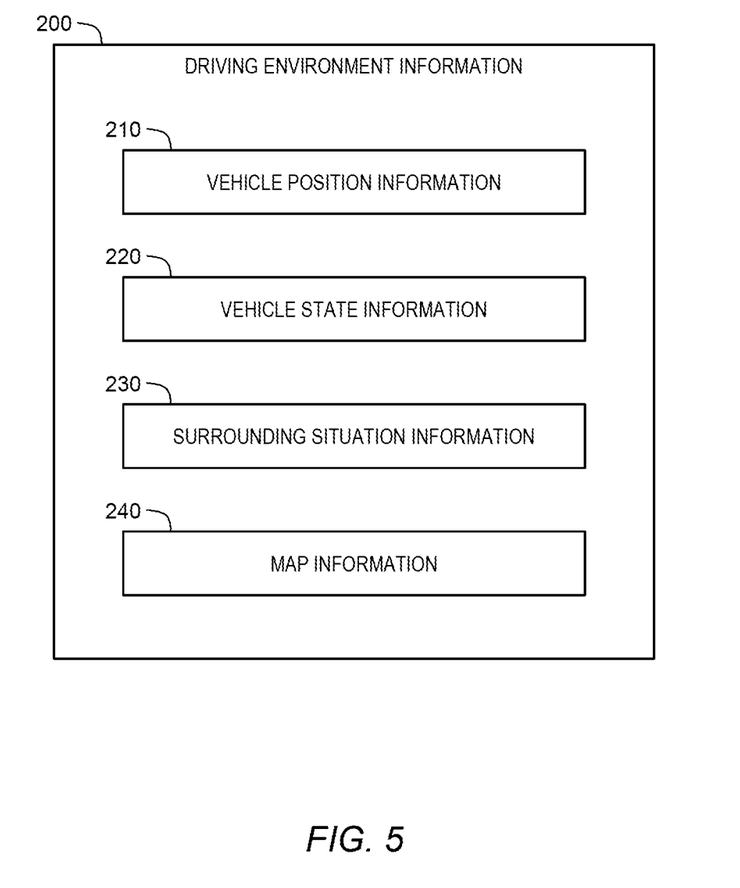
FIG. 5 is a block diagram showing an example of driving environment information in an embodiment of the present disclosure.

FIG. 5 is a block diagram showing an example of the driving environment information 200. The driving environment information 200 includes vehicle position information 210, vehicle state information 220, surrounding situation information 230, and map information 240.

The vehicle position information 210 is information indicating the position and the orientation of the vehicle 1. The processor 110 acquires the vehicle position information 210 from a result of detection by the position sensor 21.

The vehicle state information 220 is information indicating the vehicle state of the vehicle 1. Examples of the vehicle state include the vehicle speed, the yaw rate, the lateral acceleration, the steering angle, the steering torque, and the like. The processor 110 acquires the vehicle state information 220 from a result of detection by the vehicle state sensor 22.

The surrounding situation information 230 is information indicating a situation around the vehicle 1. The processor 110 acquires the surrounding situation information 230 from a result of detection by the recognition sensor 23. For example, the surrounding situation information 230 includes object information regarding an object around the vehicle 1. Examples of the object around the vehicle 1 include a surrounding vehicle, a pedestrian, a bicycle, a white line, a guardrail, a curb, a fallen object, and the like. The object information indicates a relative position and a relative speed of the object with respect to the vehicle 1.

The map information 240 indicates a lane configuration, a road shape, and the like. The processor 110 acquires the map information 240 of a necessary area from a map database. The map database may be stored in a predetermined storage device installed on the vehicle 1, or may be stored in a management server outside the vehicle 1. In the latter case, the processor 110 communicates with the management server to acquire the necessary map information 240.

5-3. Vehicle State Quantity Calculation Process

The processor 110 calculates the unstable state quantity DS and the activation threshold TH of the vehicle travel control based on the vehicle state indicated by the vehicle state information 220. For example, the unstable state quantity DS is an absolute value of a deviation between an actual yaw rate and a target yaw rate (expected yaw rate). The actual yaw rate is detected by the yaw rate sensor. The target yaw rate is calculated in accordance with a publicly-known formula that includes the steering angle and the vehicle speed as parameters. The steering angle is detected by the steering angle sensor. The vehicle speed is detected by the vehicle speed sensor (wheel speed sensor). The processor 110 calculates the target yaw rate according to the steering angle and the vehicle speed, and calculates the absolute value of the deviation between the target yaw rate and the actual yaw rate as the unstable state quantity DS. Moreover, the processor 110 calculates the activation threshold TH according to the vehicle state by using a map that indicates a correspondence relationship between the vehicle state and the activation threshold TH.

The average unstable state quantity DS_ave is an average value of the unstable state quantity DS when the lateral acceleration Gy is within the predetermined low-lateral acceleration range RNG (e.g.: 0.4G to 0.5G). For example, the average unstable state quantity DS_ave is a parameter that is measured and given in advance. As another example, the processor 110 may update the average unstable state quantity DS_ave based on the unstable state quantity DS that is calculated and accumulated every time the vehicle travel is performed.

The average activation threshold TH_ave is an average value of the activation threshold TH of the vehicle stability control when the lateral acceleration Gy is within the predetermined low-lateral acceleration range RNG. For example, the average activation threshold TH_ave is a parameter that is measured and given in advance. As another example, the processor 110 may update the average activation threshold TH_ave based on the activation threshold TH that is calculated and accumulated every time the vehicle travel is performed.

Average value information 300 is information indicating the average unstable state quantity DS_ave and the average activation threshold TH_ave. For example, the average value information 300 is generated in advance and stored in the memory device 120 (see FIG. 4). The processor 110 may update the average value information 300 every time the vehicle travel is performed.

5-4. Vehicle Travel Control

The processor 110 executes the vehicle travel control that controls the travel of the vehicle 1. The vehicle travel control includes the steering control for controlling steering of the vehicle 1, the acceleration control for controlling acceleration of the vehicle 1, and the braking control for controlling deceleration of the vehicle 1. The processor 110 executes the vehicle travel control by controlling the travel device 30. More specifically, the processor 110 executes the steering control by controlling the steering device 31. The processor 110 executes the acceleration control by controlling the driving device 32. The control device 100 executes the braking control by controlling the braking device 33.

5-5. Driving Assist Control

The processor 110 executes the driving assist control that assists driving of the vehicle 1. Examples of the driving assist control include the automated driving control, the risk avoidance control, the lane keep assist control, and the like. The driving assist control is executed based on the driving environment information 200 described above.

An example of the automated driving control is as follows. The processor 110 generates a travel plan required for arriving at a destination, based on the vehicle position information 210 and the map information 240. Furthermore, the processor 110 generates a target trajectory TR (see FIG. 1) in accordance with the travel plan. The target trajectory TR includes target positions and target velocities of the vehicle 1 in a road on which the vehicle 1 travels. Then, the processor 110 performs the vehicle travel control such that the vehicle 1 follows the target trajectory TR.

An example of the risk avoidance control is as follows. The processor 110 recognizes an object that exists ahead of the vehicle 1 and potentially collides with the vehicle 1, based on the vehicle state information 220 (the vehicle speed, and the like) and the surrounding situation information 230 (i.e., the object information). The processor 110 generates such a target trajectory TR that reduces a risk of collision with the recognized object. For example, the target trajectory TR requires steering in a direction away from the object. As another example, the target trajectory TR requires deceleration. Then, the processor 110 performs the vehicle travel control (i.e., at least one of the steering control and the braking control) such that the vehicle 1 follows the target trajectory TR.

An example of the lane keep assist control is as follows. For instance, the target trajectory TR is a center line of the travel lane. The processor 110 is able to calculate the target trajectory TR based on the map information 240 and the vehicle position information 210. As another example, the processor 110 is able to recognize the travel lane based on the surrounding situation information 230 (specifically, white line information) to calculate the target trajectory TR. The processor 110 performs the vehicle travel control such that the vehicle 1 follows the target trajectory TR.

5-6. Vehicle Stability Control

The processor 110 executes the vehicle stability control (electronic stability control) that stabilizes the behavior of the vehicle 1. Typically, the vehicle stability control is activated at a time when the vehicle 1 turns. Hereinafter, processing related to the vehicle stability control according to the present embodiment will be described.

5-6-1. Processing when Driving Assist Control is not in Execution

Figure 6:
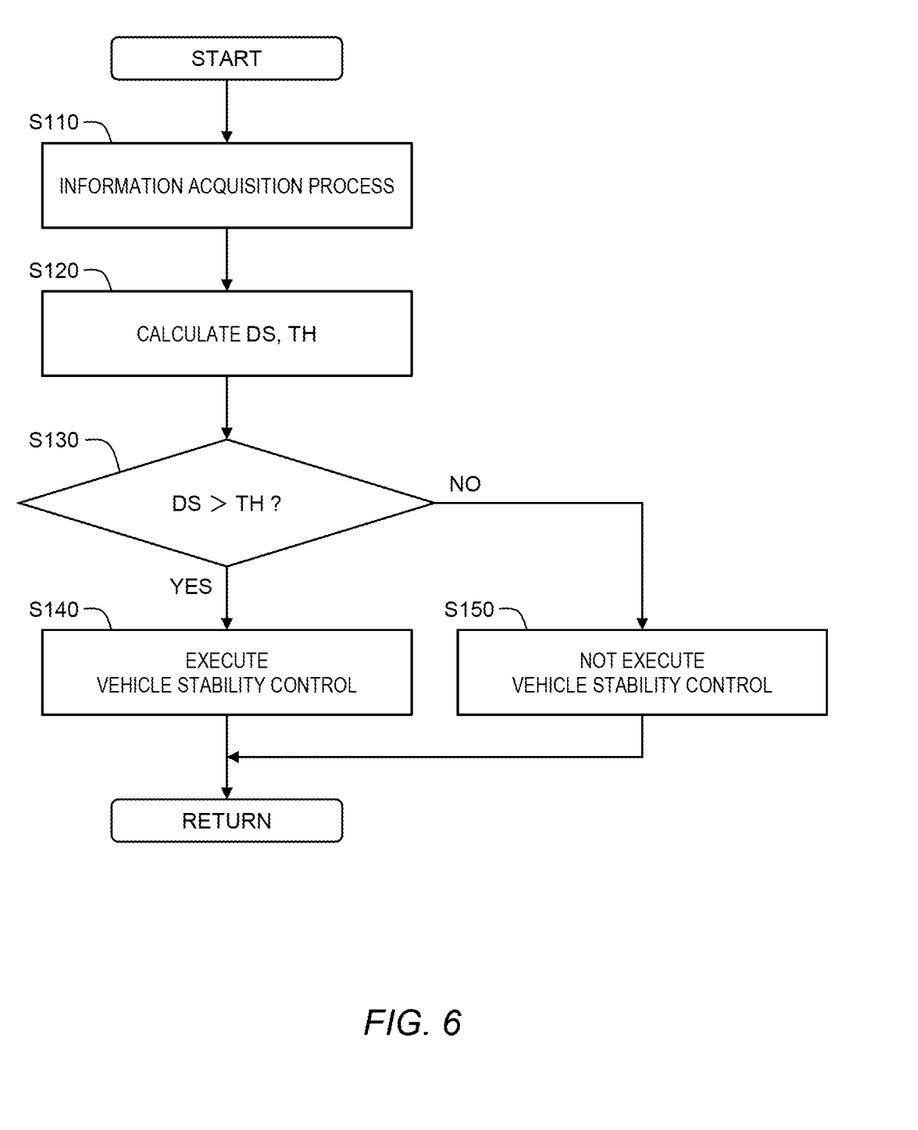
FIG. 6 is a flow chart showing processing related to the vehicle stability control when the driving assist control is not in execution.

FIG. 6 is a flow chart showing the processing related to the vehicle stability control when the driving assist control is not in execution. The process flow shown in FIG. 6 is repeatedly executed at regular intervals.

In Step S110, the processor 110 executes the information acquisition process described above. That is, the processor 110 acquires the driving environment information 200 based on a result of detection by the sensor group 20. The driving environment information 200 is stored in the memory device 120.

In Step S120, the processor 110 executes the vehicle state quantity calculation process described above. That is, the processor 110 calculates the unstable state quantity DS and the activation threshold TH of the vehicle travel control based on the vehicle state indicated by the vehicle state information 220.

In Step S130, the processor 110 determines whether or not the activation condition of the vehicle stability control is satisfied. In the case where the driving assist control is not in execution, the activation condition of the vehicle stability control is that "the unstable state quantity DS is larger than the activation threshold TH." When the activation condition is satisfied (Step S130; Yes), the processing proceeds to Step S140. On the other hand, when the activation condition is not satisfied (Step S130; No), the processing proceeds to Step S150.

In Step S140, the processor 110 executes the vehicle stability control, that is, activates the vehicle stability control. In order to stabilize the behavior of the vehicle 1, the processor 110 generates such a counter yaw moment that counteracts the unstable behavior.

For example, the processor 110 generates the counter yaw moment by performing the braking control to generate a difference in braking force between left and right wheels. For example, the counter yaw moment for resolving the oversteer state when turning can be generated by generating the braking force in an outer front wheel or in both the outer front wheel and an outer rear wheel. As another example, the counter yaw moment for resolving the understeer state when turning can be generated by generating the braking force in an inner front wheel or in both the inner front wheel and an inner rear wheel. The processor 110 calculates a braking control amount with respect to each wheel and controls the braking device 33 in accordance with the braking control amount.

As another example, the processor 110 may generate the counter yaw moment by performing the steering control to turn (i.e., change a direction of) the wheel. In this case, the processor 110 calculates a steering control amount required for generating the counter yaw moment and controls the steering device 31 in accordance with the steering control amount.

In Step S150, the processor 110 does not execute the vehicle stability control, that is, does not activate the vehicle stability control. When the vehicle stability control is already in execution, the processor 110 terminates the vehicle stability control.

5-6-2. Processing when Driving Assist Control is in Execution

Figure 7:
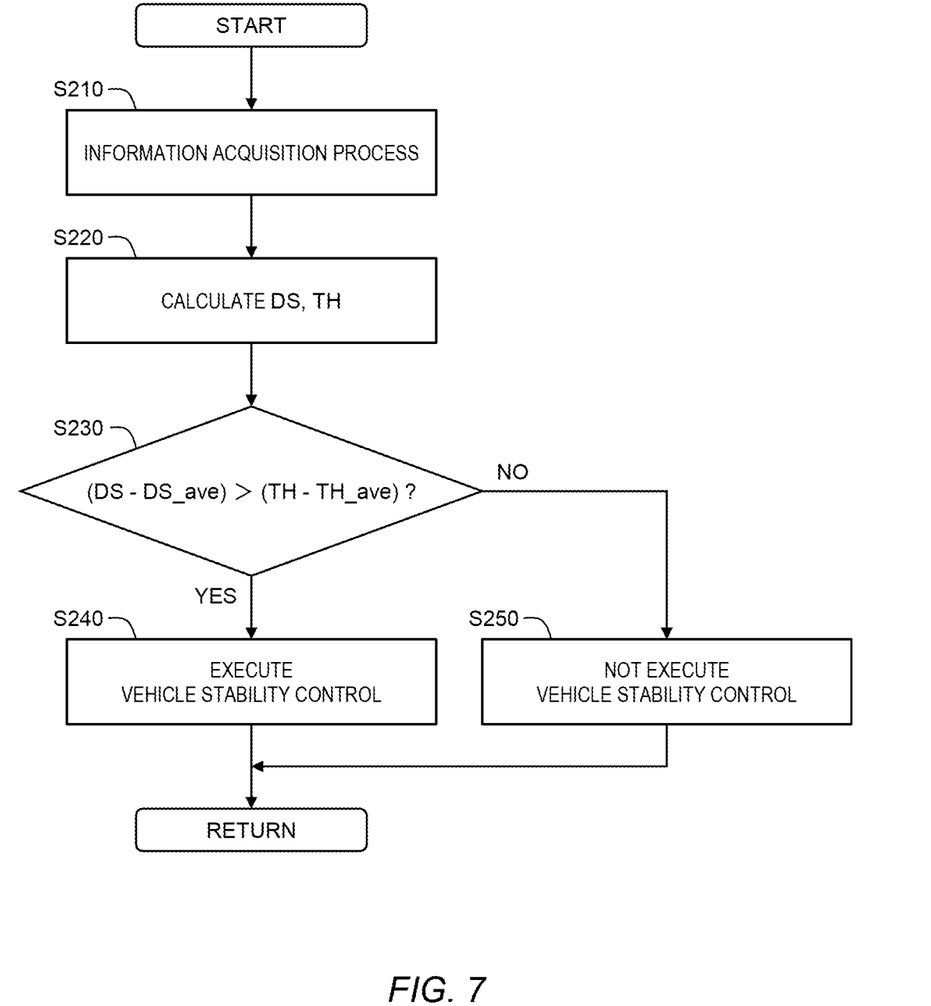
FIG. 7 is a flow chart showing processing related to the vehicle stability control when the driving assist control is in execution.

FIG. 7 is a flow chart showing the processing related to the vehicle stability control when the driving assist control is in execution. The process flow shown in FIG. 7 is repeatedly executed at regular intervals.

Step S210 is the same as the above-described Step S110. The processor 110 executes the information acquisition process to acquire the driving environment information 200.

Step S220 is the same as the above-described Step S120. The processor 110 executes the vehicle state quantity calculation process to calculate the unstable state quantity DS and the activation threshold TH of the vehicle travel control.

In Step S230, the processor 110 determines whether or not the activation condition of the vehicle stability control is satisfied. In the case where the driving assist control is in execution, the activation condition of the vehicle stability control is that "the state change amount ΔDS is larger than the threshold change amount ΔTH." The state change amount ΔDS is an amount of increase in the unstable state quantity DS from the average unstable state quantity DS_ave. The threshold change amount ΔTH is an amount of increase in the activation threshold TH from the average activation threshold TH_ave. The average unstable state quantity DS_ave and the average activation threshold TH_ave are obtained from the average value information 300 stored in the memory device 120. When the activation condition is satisfied (Step S230; Yes), the processing proceeds to Step S240. On the other hand, when the activation condition is not satisfied (Step S230; No), the processing proceeds to Step S250.

Step S240 is the same as the above-described Step S140. The processor 110 executes the vehicle stability control, that is, activates the vehicle stability control.

Step S250 is the same as the above-described Step S150. The processor 110 does not execute the vehicle stability control, that is, does not activate the vehicle stability control.

What is claimed is:

1. A vehicle control system that controls travel of a vehicle, the vehicle control system comprising:
    a processor configured to execute vehicle stability control that stabilizes a behavior of the vehicle and driving assist control that assists driving of the vehicle; and
    a memory storing vehicle state information that indicates a vehicle state detected by a sensor installed on the vehicle, wherein
    the processor is further configured to calculate an unstable state quantity representing instability of the vehicle and an activation threshold of the vehicle stability control, based on the vehicle state indicated by the vehicle state information,
    an average unstable state quantity is an average value of the unstable state quantity when a lateral acceleration of the vehicle is within a predetermined range,
    an average activation threshold is an average value of the activation threshold when the lateral acceleration is within the predetermined range,
    a state change amount is an amount of increase in the unstable state quantity from the average unstable state quantity,
    a threshold change amount is an amount of increase in the activation threshold from the average activation threshold, and
    when the driving assist control is in execution, the processor is further configured to activate the vehicle stability control in response to the state change amount becoming larger than the threshold change amount.

2. The vehicle control system according to claim 1, wherein
    when the driving assist control is not in execution, the processor is further configured to activate the vehicle stability control in response to the unstable state quantity becoming larger than the activation threshold.

3. The vehicle control system according to claim 1, wherein
the memory further stores average value information indicating the average unstable state quantity and the average activation threshold.

4. The vehicle control system according to claim 1, wherein
in the driving assist control, the processor is further configured to generate a target trajectory and control the travel of the vehicle such that the vehicle follows the target trajectory.

5. The vehicle control system according to claim 1, wherein
an upper limit of the predetermined range is 0.5× acceleration of gravity.

6. A vehicle control method that controls travel of a vehicle, the vehicle control method comprising:
executing vehicle stability control that stabilizes a behavior of the vehicle;
executing driving assist control that assists driving of the vehicle;
detecting a vehicle state by a sensor installed on the vehicle; and
calculating an unstable state quantity representing instability of the vehicle and an activation threshold of the vehicle stability control, based on the vehicle state detected by the sensor, wherein
an average unstable state quantity is an average value of the unstable state quantity when a lateral acceleration of the vehicle is within a predetermined range,
an average activation threshold is an average value of the activation threshold when the lateral acceleration is within the predetermined range,
a state change amount is an amount of increase in the unstable state quantity from the average unstable state quantity,
a threshold change amount is an amount of increase in the activation threshold from the average activation threshold, and
the vehicle control method further comprises activating the vehicle stability control in response to the state change amount becoming larger than the threshold change amount, when the driving assist control is in execution.

* * * * *